US008581138B2

(12) United States Patent
Kowalsky et al.

(10) Patent No.: US 8,581,138 B2
(45) Date of Patent: Nov. 12, 2013

(54) THERMAL SPRAY METHOD AND APPARATUS USING PLASMA TRANSFERRED WIRE ARC

(75) Inventors: Keith A. Kowalsky, Oyster Bay, NY (US); David J. Cook, Irving, TX (US); Daniel R. Marantz, Ocean Ridge, FL (US); John Conti, Williston Park, NY (US)

(73) Assignee: Flame-Spray Industries, Inc., Port Washington, NY (US)

( * ) Notice: Subject to any disclaimer, the term of this patent is extended or adjusted under 35 U.S.C. 154(b) by 0 days.

(21) Appl. No.: 13/334,851

(22) Filed: Dec. 22, 2011

(65) Prior Publication Data

US 2012/0160813 A1 Jun. 28, 2012

Related U.S. Application Data

(60) Provisional application No. 61/426,028, filed on Dec. 22, 2010.

(51) Int. Cl.
*B23K 10/00* (2006.01)

(52) U.S. Cl.
USPC .............. 219/121.47; 219/76.16; 219/121.59; 427/539

(58) Field of Classification Search
CPC ........................................................ B23K 10/00
USPC ............. 219/121.47, 121.59, 121.51, 121.54, 219/76.15, 76.16; 427/449, 539
See application file for complete search history.

(56) References Cited

U.S. PATENT DOCUMENTS

| | | | | |
|---|---|---|---|---|
| 4,370,538 | A * | 1/1983 | Browning | 219/121.59 |
| 5,296,667 | A * | 3/1994 | Marantz et al. | 219/121.47 |
| 5,592,927 | A | 1/1997 | Zaluzec et al. | |
| 5,707,693 | A | 1/1998 | Vliet et al. | |
| 5,938,944 | A | 8/1999 | Baughman et al. | |
| 6,001,426 | A * | 12/1999 | Witherspoon et al. | 427/449 |
| 6,124,563 | A | 9/2000 | Witherspoon et al. | |
| 6,372,298 | B1 | 4/2002 | Marantz et al. | |
| 6,610,959 | B2 * | 8/2003 | Carlson et al. | 219/76.15 |
| 6,703,579 | B1 * | 3/2004 | Rice | 219/121.47 |
| 6,706,993 | B1 * | 3/2004 | Chancey et al. | 219/121.47 |
| 2012/0018407 | A1 * | 1/2012 | Schramm et al. | 219/76.16 |

* cited by examiner

*Primary Examiner* — Mark H Paschall
(74) *Attorney, Agent, or Firm* — Carmody & Torrance LLP

(57) ABSTRACT

A method of thermally depositing metal onto a target surface using a plasma transferred wire arc thermal spray apparatus, wherein the method includes the steps of offsetting the central axis of a consumable wire with respect to an axial centerline of a constricting orifice; and establishing and operating a plasma transferred wire arc between a cathode and a free end of the consumable wire; and melting and atomizing a continually fed free end of the consumable wire into molten metal particles and projecting the particles onto said target surface.

26 Claims, 5 Drawing Sheets

X-AXIS
PRIOR ART
EXTENDED
TAPER
Axis of Rotation
(Z-AXIS)
0.0625
TYP. WIREø
.004"-.006"
TYP

TORCH
ROTATION

EXTENDED
WIRE GUIDE

EXTENDED
TAPERED
WIRE GUIDE

THERMAL SPRAY METHOD AND APPARATUS USING PLASMA TRANSFERRED WIRE ARC

CROSS REFERENCE TO RELATED APPLICATION

This application claims the benefit of U.S. Provisional Application No. 61/426,028, filed Dec. 22, 2010, the subject matter of which is herein incorporated by reference in its entirety.

BACKGROUND OF THE INVENTION

1. Technical Field

This invention relates to electric are spraying of metals and, more particularly, to a plasma arc transferred to a single wire tip that is fed continuously into the plasma-arc.

2. Discussion of the Prior Art

As disclosed in earlier U.S. patents by the co-inventors herein, plasma transferred wire arc is a thermal spray process which melts a continuously advancing feedstock material (usually in the form of a metal wire or rod) by using a constricted plasma-arc to melt only the tip of the wire or rod (connected as an anodic electrode); the melted particles are then propelled to a target. The plasma is a high velocity jet of ionized gas which is desirably constricted and focused about a linear axis by passing it through a nozzle orifice downstream of a cathode electrode; the high current arc, which is struck between the cathode electrode and the anodic nozzle, is transferred to the wire tip maintained also as an anode or the high current arc can be transferred directly to the wire tip. The arc and plasma jet provides the necessary thermal energy to continuously melt the wire tip, and the plasma provides the dynamics to atomize the molten wire tip into finely divided particles and accelerates the melted particles as a stream generally along the axis of the plasma. Acceleration of the particles is assisted by use of highly compressed secondary gas, directed as a converging gas streams about the plasma-arc axis, which streams converge at a location immediately downstream of where the wire tip intersects the plasma-arc, but avoid direct impingement with the wire tip to prevent excessive cooling of the plasma-arc.

Existing plasma transferred wire arc (PTWA) torches and associated apparatus of the prior art, used to generate the plasma transferred wire arc are sensitive to instabilities in the process resulting in occasional poorly atomized particles of melted or unmelted metal rather than spraying of fine molten particles. Process instabilities can occur when one or more of the following are outside of controlled or designed ranges: secondary air flow or pressure, plasma gas pressure, wire feed rate, wire arc current and torch rotational and linear movement rate. The occurrences of such instabilities are not fully predictable.

Poorly atomized particles results from multiple issue including the accumulation of melted particles which tend to agglomerate and form globules or droplets that move back up along the wire under the influence of the fluid dynamics of the plasma jet and secondary gases. Such globules or droplets can contaminate the wire tip and/or release the globules for projection that produces a non-uniform deposit. Process instabilities that allow particles to agglomerate may have their origin in a change of electrode shape or nozzle shape over time due to wear, buildup of contaminants, or due to irregularities such as the rate of wire feed by the automatic feeding mechanism or changes in the level of current passing through the wire.

SUMMARY OF THE INVENTION

It is an object of the present invention to improve the plasma transferred wire arc process so that it may be operated more robustly to provide high quality deposits and/or faster deposition rates without any reduction in the quality of the deposit.

In accordance with a first embodiment, the present invention is directed to a method of thermally depositing metal onto a target surface using a plasma transferred wire arc thermal spray apparatus, wherein the apparatus comprises a cathode, a nozzle generally surrounding a free end of said cathode in spaced relation having a constricted orifice opposite said cathode free end, a source of plasma gas that is directed into said nozzle surrounding said cathode and exiting said constricted nozzle orifice, and a wire feed directing a free end of a consumable wire, having a central axis, to a position for establishing and maintaining a plasma arc and melting the free end of the consumable wire, wherein the consumable wire has an electrical potential opposite of the cathode, wherein the method comprises the steps of offsetting the central axis of the consumable wire with respect to an axial centerline of the constricting orifice; and establishing and operating a plasma transferred wire arc between the cathode and a free end of the consumable wire; and melting and atomizing a continually fed free end of the consumable wire into molten metal particles and projecting the particles onto said target surface.

In accordance with another embodiment of the present invention, a method of thermally depositing metal onto a target surface using a plasma transferred wire arc thermal spray apparatus is provided, wherein the apparatus comprises a cathode, a nozzle generally surrounding a free end of said cathode in spaced relation having a constricted orifice opposite said cathode free end, a source of plasma gas that is directed into said nozzle surrounding said cathode and exiting said constricted nozzle orifice, and a wire feed directing a free end of a consumable wire, having a central axis, to a position for establishing and maintaining a plasma arc and melting the free end of the consumable wire, wherein the central axis of the consumable wire is offset with respect to an axial centerline of the constricting orifice; wherein the consumable wire has an electrical potential opposite of the cathode, and wherein the method comprises the steps of establishing and operating a plasma transferred wire arc between the cathode and a free end of the consumable wire which is offset with respect to an axial centerline of the constricting orifice; and melting and atomizing a continually fed free end of the consumable wire into molten metal particles and projecting the particles onto said target surface.

In yet another embodiment of the present invention, a plasma transferred wire arc thermal spray apparatus for thermally depositing molten metal from a continuously fed free end of a consumable wire onto a target surface is provided. In this embodiment, the apparatus comprises a cathode; a nozzle generally surrounding a free end of said cathode in spaced relation, the nozzle having a constricted orifice opposite said cathode free end; a source of plasma gas that is directed into said nozzle surrounding said cathode and exiting said constricted nozzle orifice towards the free end of a consumable wire; a wire feed means directing the free end of the consumable wire, having a central axis, to a position for establishing and maintaining a plasma arc and melting the free end of the consumable wire, wherein the central axis of the consumable wire is offset with respect to an axial centerline of the constricting orifice, wherein the consumable wire has an electrical potential opposite of the cathode; means for establishing and operating a plasma transferred wire arc between the cathode and a free end of the consumable wire; and means for melting and atomizing a continually fed free end of the consumable wire into molten metal particles and projecting the particles onto said target surface.

Products made by the methods disclosed above and using the apparatus disclosed above are also provided.

DETAILED DESCRIPTION AND BEST MODE

Figure 1:
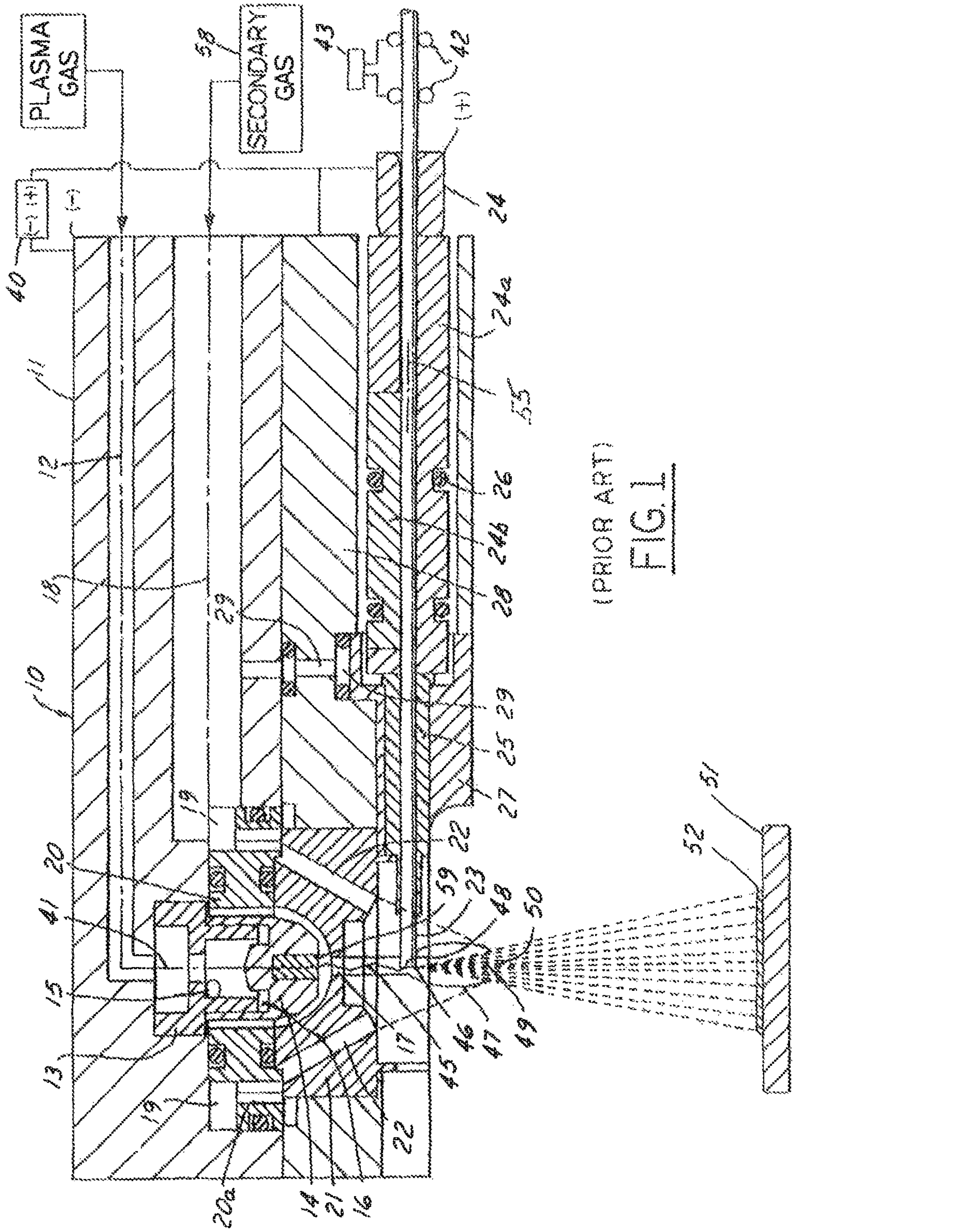
(PRIOR ART) FIG. 1
FIG. 1 is a schematic representation of a prior art PTWA torch configuration producing an extended plasma-arc.

FIG. 1 shows a schematic representation of a prior art PTWA torch assembly 10 consisting of a torch body 11 containing a plasma gas port 12 and a secondary gas port 18; the torch body 11 is formed of an electrically conductive metal. The plasma gas is connected by means of port 12 to a cathode holder 13 through which the plasma gas flows into the inside of the cathode assembly 14 and exits through tangential ports 15 located in the cathode holder 13. The plasma gas forms a vortex flow between the outside of the cathode assembly 14 and the internal, surface of the pilot plasma nozzle 16 and then exits through the constricting orifice 17. The plasma gas vortex provides substantial cooling of the heat being dissipated by the cathode function.

Secondary gas enters the torch assembly through gas inlet port 18 which directs the secondary gas to a gas manifold 19 (a cavity formed between baffle plate 20 and torch body 11 and thence through bores 20*a* into another manifold 21 containing bores 22). The secondary gas flow is uniformly distributed through the equi-angularly spaced bores 22 concentrically surrounding the outside of the constricting orifice 17. The flow of the secondary gas through the equi-angularly spaced bores 22 (within the pilot nozzle 16) provides atomization to the molten particles, carrier gas for the particles and cooling to the pilot nozzle 16 and provides minimum disturbance to the plasma-arc, which limits turbulence.

A wire feedstock 23 is fed (by wire pushing and pulling feed rollers 42, driven by a speed controlled motor 43) uniformly and constantly through a wire contact tip 24, the purpose of which is to make firm electrical contact to the wire feedstock 23 as it slides through the wire contact tip 24; in this embodiment it is composed of two pieces, 24*a* and 24*b*, held in spring or pressure load contact with the wire feedstock 23 by means of rubber ring 26 or other suitable means. The wire contact tip 24 is made of high electrical conducting material. As the wire exits the wire contact tip 24, it enters a wire guide tip 25 for guiding the wire feedstock 23 into precise alignment with axial centerline 41 of the critical orifice 17. The wire guide tip 25 is supported in a wire guide tip block 27 contained within an insulating block 28 which provides electrical insulation between the main body 11 which is held at a negative electrical potential, while the wire guide tip block 27 and the wire contact tip 24 are held at a positive potential. A small port 29 in the insulator block 28 allows a small amount of secondary gas to be diverted through wire guide tip block 27 in order to provide heat removal from the block 27 This can also be done via a bleed gas around or through the nozzle. The wire guide tip block 27 is maintained in pressure contact with the pilot nozzle 16 to provide an electrical connection between the pilot nozzle 16 and the wire guide tip block 27. Electrical connection is made to the main body 11 and thereby to the cathode assembly 14 (having cathode 59) through the cathode holder 13 from the negative terminal of the power supply 40; the power supply may contain both a pilot power supply and a main power supply operated through isolation contactors, not shown. Positive electrical connection is made to the wire contact tip 24 and block 28 of the transferred plasma-arc torch from the positive terminal of the power supply 40. Wire feedstock 23 is fed toward the centerline 41 of orifice 17, which is also the axis of the extended arc 46; concurrently, the cathode assembly 14 is electrically energized with a negative charge and the wire 23, as well as the nozzle 16 although the nozzle can be isolated, is electrically charged with a positive charge. The wire guide and wire can be positioned relative to the nozzle by many different methods including the nozzle itself has the features for holding and positioning of the wire guide. The torch may be desirably mounted on a power rotating support (not shown) which revolves the gun around the wire axis 55 to coat the interior of bores. Additional features of a commercial torch assembly are set forth in U.S. Pat. No. 5,938,944, the disclosure of which is incorporated herein by reference.

Figure 2:
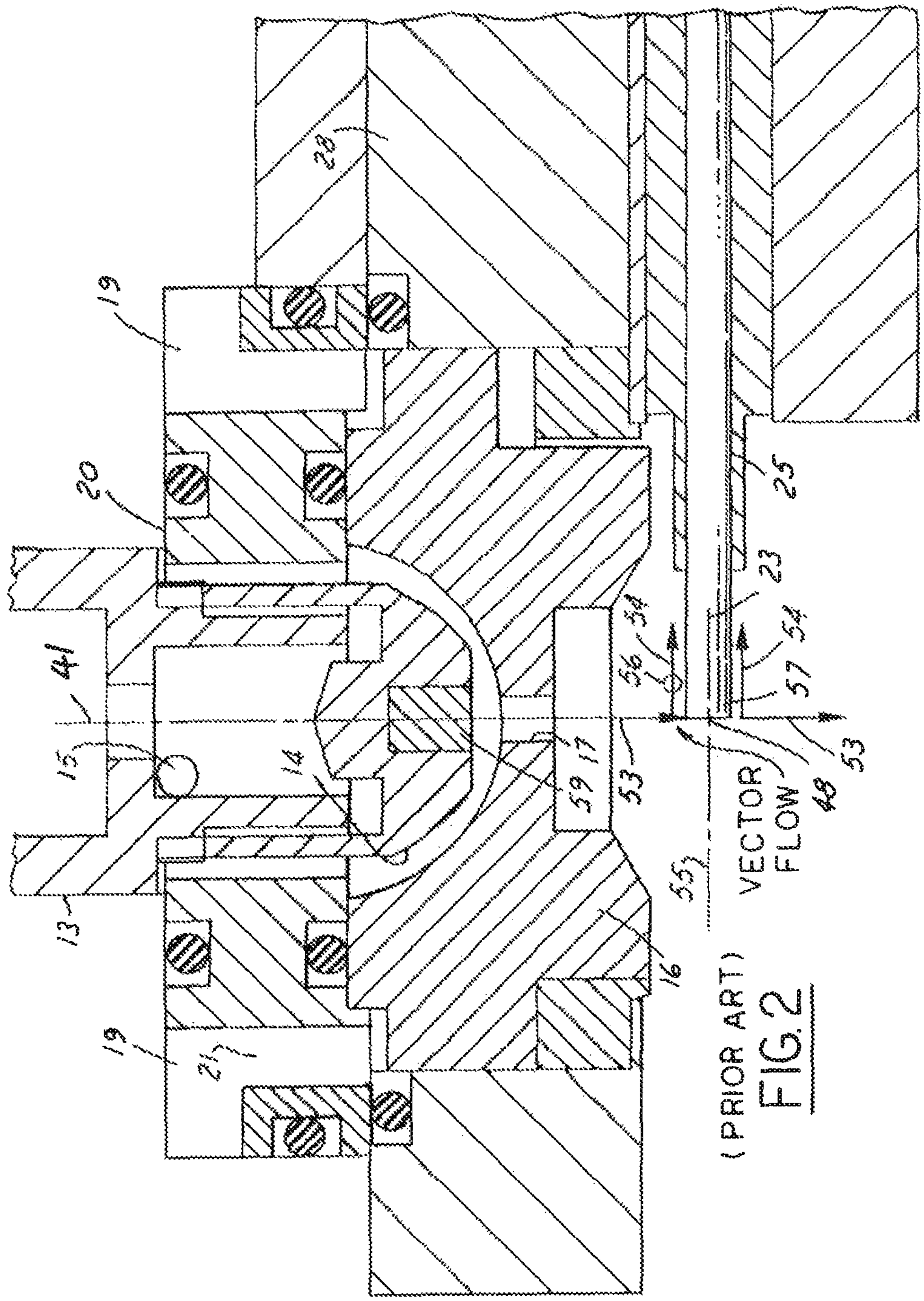
(PRIOR ART) FIG. 2
FIG. 2 is an enlarged representation of the anode nozzle and wire free-end of FIG. 1 illustrating vector forces that arise due to instabilities in the process.

To initiate operation of the PTWA torch, plasma gas at an inlet gas pressure of between 50 and 140 psig is caused to flow through port 12, creating a vortex flow of the plasma gas about the inner surface of the pilot nozzle and then, after an initial period of time of typically two seconds, high-voltage dc power or high frequency power is connected to the electrodes causing a pilot arc and pilot plasma to be momentarily activated. Additional energy is then added to the pilot arc and plasma by means of increasing the plasma arc current to the electrodes to typically between 60 and 85 amps, as set forth in U.S. Pat No. 5,938,944, to extend the plasma-arc providing an electrical path 45 for the plasma-arc to transfer from the nozzle to the wire tip or free-end 57 (as shown in FIG. 2). Wire is fed by means of wire feed rolls 42 into the extended transferred plasma-arc sustaining it even as the wire free end 57 is melted off by the intense heat of the transferred arc 46 and its associated plasma 47 which surrounds the transferred arc 46. Molten metal particles 48 are formed on the tip end of the wire 23 and are atomized into fine, particles 50 by the viscous shear force established between the high velocity, supersonic plasma jet and the initially stationary molten droplets. The molten particles 48 are further atomized and accelerated by the much larger mass flow of secondary gas through bores 22 which converge at a location or zone 49 beyond the melting of the wire tip 47, now containing the finely divided particles 50, which are propelled to the substrate surface 51 to form a deposit 52.

In the most stable condition of the prior art PTWA thermal spraying process as shown in FIG. 2 also some of items mentioned below are not pictured in FIG. 2, wire 23 will be melted and particles 50 will be formed and immediately carried and accelerated along centerline 41 by vector flow forces 53 in the same direction as the supersonic plasma gas 47; a uniform dispersion 50 of fine particles, without aberrant globules, will be obtained. The vector forces 53 are the axial force components of the plasma-arc energy and the high level converging secondary gas streams. However, under some conditions instabilities occur where particles 48, from the melted wire tip are not uniformly melted as the PTWA torch is rotated around the central axis of the wire feed stock whereby some part of the wire tip is accelerated away from the wire tip in larger droplets which are not atomized into fine particles. These large particle or droplets are propelled as large agglomerate masses toward the substrate 51 and are included into the coating as it is being formed, resulting in coating of poor quality.

As indicated earlier, secondary high velocity and high flow gas is released from equi-angularly spaced bores 22 to project a curtain of gas streams about the plasma-arc. The supply 58 of secondary gas, such as air, is introduced into chamber 19 under high flow, with a pressure of about 20-120 psig at each bore 22. Chamber 19 acts as a plenum to distribute the secondary gas to the plenum 21, which distributes the secondary gas to the series of equi-angularly spaced bores 22 which direct the gas as a concentric converging stream which assist the atomization and acceleration of the particles 50. Each bore has an internal diameter of about 0.060-0.090 inches and project a high velocity air flow at a flow rate of about 20-60 scfm from the total of all of the bores 22 combined. The plurality of bores 22, typically ten in number, are located concentrically around the pilot nozzle orifice 17, and are radially, equally spaced apart 36 degrees. To avoid excessive cooling of the plasma arc, these streams are radially located so as not to impinge directly on the wire free-end 57 (see FIG. 2). The bores 22 are spaced angularly apart so that the wire free-end 57 is centered midway between two adjacent bores, when viewed along centerline 41. Thus, as shown in FIG. 2, bores 22 will not appear because the section plane is through the wire; FIG. 1 shows the bores 22 only for illustration purposes and it should be understood they are show out of position (typically 18 degrees for a nozzle with 10 radial bores 22) and are not in the section plane for this view. The converging angle of the gas streams is typically about 30 degrees relative to the centerline 41, permitting the gas streams to engage the particles downstream of the wire-plasma intersection zone 49.

As a result of experimentation by the present inventors, it was discovered that instabilities were observed, under conditions of rotating the PTWA torch about the central axis of the feedstock wire 55, in the area of intersection of the axis of the wire 55 with the central axis of the plasma 41. After close examination of the conditions occurring in this area, it was concluded that there was several causes contributing to those instabilities. The result of these instabilities was that the formations of large particles or droplets are formed, resulting in poorly atomized particles, causing the formation of large unwanted inclusions in the resulting coatings. In addition, in the operation of the prior art plasma transferred wire arc (PTWA) torch it was found that the it was necessary to significantly reduce the wire feed rate in order to minimize the instabilities, thereby reducing the productivity of the process.

Figure 3A:
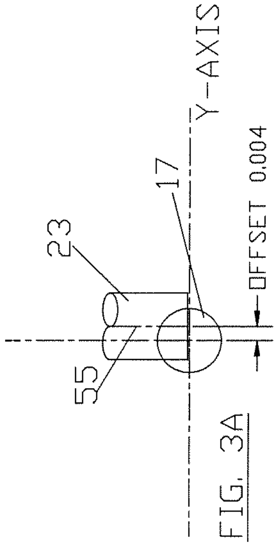
FIG. 3A illustrates schematically, the repositioning of the center of the wire in accordance with one embodiment of the present invention.
Figure 3B:
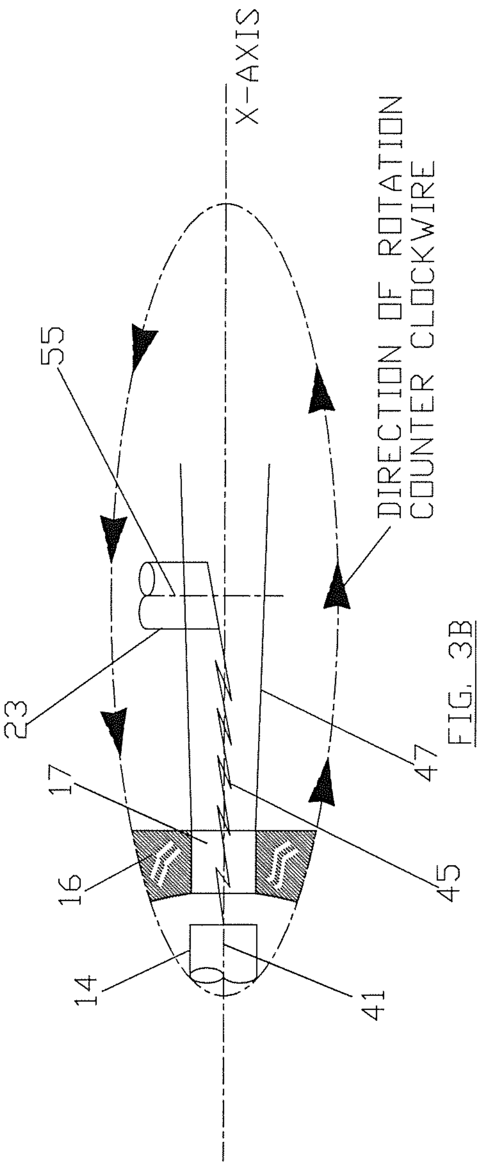
FIG. 3B is a schematic representation in detail, of one embodiment of the present invention.
Figure 5:
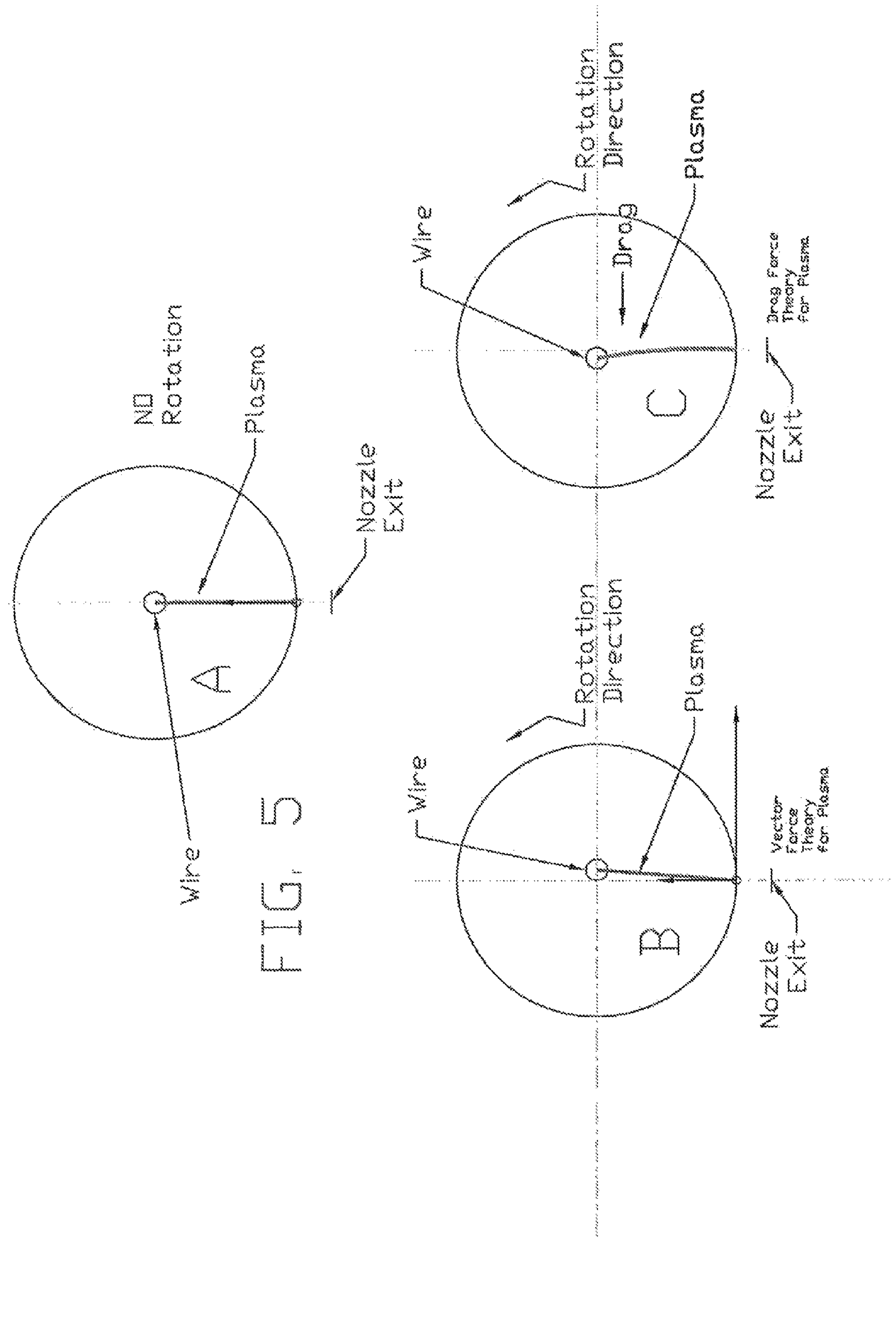
FIG. 5 is a schematic that shows the plasma impinging on the wire tip and the influences that can affect the actual plasma position.

Upon careful analysis of the operating conditions and close visual examination of the prior art PTWA torch, of the conditions at the point where the plasma arc 45 attached to the wire feedstock 23, while rotating the plasma around the wire axis 55, it was discovered that the plasma arc attachment point to the wire, randomly repositioned itself This random condition appeared to have a significant contribution to instabilities in the melting conditions of the tip end of the feedstock wire. Based on experimentation as a follow-up to these observations, it was discovered that a relatively small repositioning of the wire axis relative to the central axis of the plasma constricting orifice, such repositioning being in the direction of rotation of the plasma about the wire axis, and in a plane at right angles to the central axis of the plasma constricting orifice, greatly reduces and/or eliminated the rotationally formed instabilities. As shown in FIG. 3A, specifically, it was found that it was desirable to re-locate the wire axis 55 relative to the central axis of the plasma 41 by an amount within the range of 0.002 inch to 0.020 inch with the specific amount being dependant on several factors such as wire diameter, wire feed rate, current, plasma orifice diameter, plasma operating parameters, and rotational speed. In addition, it was discovered that the direction for relocation of the wire axis 55 is dependent on the direction of rotation (clockwise or counter clockwise) about the wire axis 55 with the preferred direction moving the axis of the wire 55 to the right of the plasma central axis 41 when the plasma is being rotated counter clockwise around the wire axis 55. The wire axis 55 is moved in a direction which is in a plane which is normal to the central axis of the plasma constricting orifice and which conforms to the axis of rotation of the PTWA torch. It should be understood that position of the wire guide tip 25 can be fixed in its relationship with the central axis of the plasma 41 or the position can be made adjustable with respect to the central axis of the plasma 41. These experimental results differed from what was expected. With reference to FIG. 5, as the plasma was rotated around the wire, it was thought that the preferred relocation position for the wire with respect to the central axis of the plasma would be such that the central axis of the wire should be moved to the left of the centerline of rotation. This expectation was based on the premise that as the plasma rotated, generally at about 400 revolutions per minute (rpm), the vector forces due to the rotation would suggest this wire position. However it was discovered that when this adjustment was made, the instabilities in melting became worse. Experimentally, when the wire centerline was move to the right of the centerline of rotation it was discovered that the instabilities of melting of the wire were eliminated, greatly enhancing the overall process stability. Further evaluation of this situation revealed that due to windage forces and momentum forces acting on the plasma resulted in a bending of the plasma as seen in FIG. 5*c* bending the plasma in a direction slightly lagging relative to the direction of rotation. Wire position should be adjusted accordingly in order to compensate for this predicted bending of the plasma. With further experimentation it was discovered that adjusting the position of the central axis of the wire feedstock in the same direction as that of the direction of rotation of the plasma provided very positive beneficial results.

A typical example of the operating parameters of the PTWA torch which is in accordance with the present invention of repositioning of the wire axis 55 with respect to the central axis of the plasma 41 is presented in Table 1.

TABLE 1

| | |
|---|---|
| Wire Diameter- inch | 0.062 |
| Constricting Orifice- inch | 0.060 |
| Plasma Gas | Ar—H2 65/35 |
| Secondary Gas | Air |
| Plasma Current- amps | 85 |
| Plasma Gas Flow- scfm | 3.2 |
| Secondary Gas Flow- scfm | 40 |

TABLE 1-continued

| | |
|---|---|
| Wire Feed Rate- ipm | 345 |
| Wire Relocation- inch | 0.004 |

The typical wire feed rate for a prior art PTWA torch operating at the parameters shown in Table 1 was 245 inches per minute and after relocation of the wire axis of 0.004 inches, in accordance with a preferred modification and in accordance with the present invention, to a PTWA torch, a wire feed rate, as shown in Table 1, of 345 inches per minute was obtained. This represents an increase of productivity of nearly 45% based on the present invention as compared to the prior art PTWA operation. In addition, operating at the increased wire feed rate of 345 inches per minute, no instabilities were observed and no poorly atomized particles occurred representing a significant improvement compared to the operation of the prior art PTWA as well it also helps increase stability when running at lower feed rates.

Another source of instability in the plasma arc rooting to the wire feed stock was observed to be caused by the wire tip end 48 randomly wandering from its predetermined position with respect to the plasma arc central axis 41. This random movement is result of residual curvature in the wire even after wire straightening is appropriately employed. In order to stabilize the wire position it was discovered that providing full wire support as close as possible to the central axis of the plasma 41 without disturbing the gas flow pattern exiting from the radial bores 22 added a further addition to the PTWA process stability. This was accomplished by the wire electrode being fully guided within said wire guide tip 25 up to the point where the end of the wire guide tip is on the edge of the outside of the secondary gas jets which are exiting from the radial bores 22. This resulted in further minimizing the non-uniform melting of the wire feedstock thereby further eliminating excessively large particle formation of particles and also resulting in higher wire feed rates for a given set of operating parameters for a greater efficiency of productivity as well it also helps increase stability when running at lower feed rates.

Figures 4, 4A, 4B, 4C:
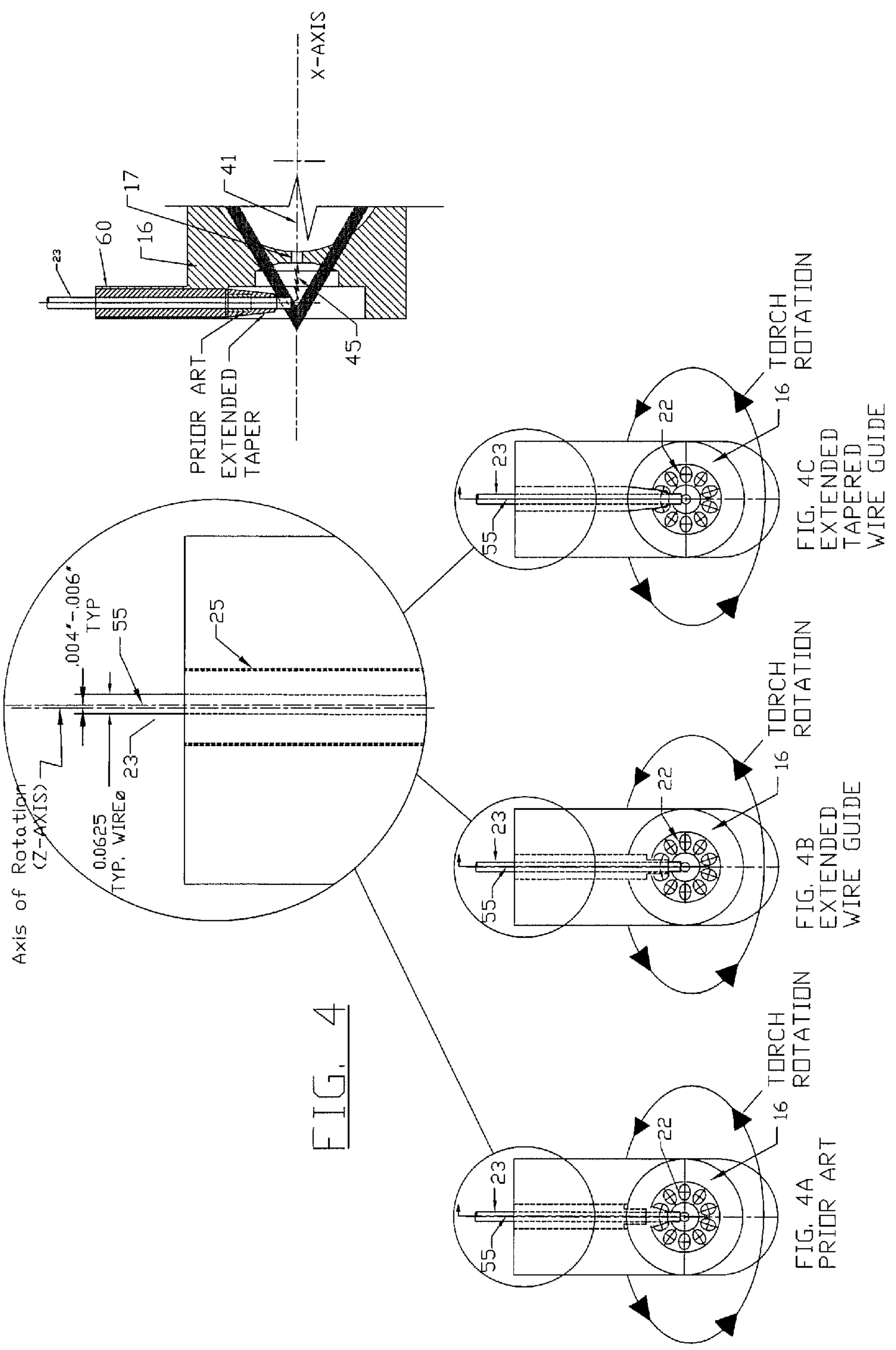
FIG. 4A PRIOR ART
FIG. 4 is a schematic representation of the combined features of the various embodiments of the present invention as illustrated in both plan and elevation views.

This further embodiment of the present invention is depicted in FIG. 4 which is a view of a typical nozzle/wire area of an improved PTWA torch which incorporates both of the preferred embodiments of the present invention. As shown in FIG. 4 the wire feedstock 23 is critically guided to properly position the wire tip 48 with respect to the plasma axis 41. Due to residual stresses remaining in the wire feed stock 23 after annealing and wire straightening some degree of curvature remains in the wire which can cause the tip end of the wire 48 to vary in its position thereby causing instabilities. It was found critical to support and guide the wire as close to the proper position in relation to the central axis of the plasma 41 as possible, minimizing any variation from its set position. In the prior art PTWA torch, wire is supported and guided up to within 0.25 inches of the central axis of the plasma 41. It was found that it was possible to extend the support and guidance of the wire to within 0.10 inches without disturbing the gas flow from the secondary bore 22. Improvement in operational stability was observed over a range of from 0.10 to 0.25 inches. In addition, tighter control of the bore of the wire guide 60 to the wire feedstock diameter produced greatly enhanced stability of operation as well as providing the ability to operate at higher wire feed rates. This was observed when the bore diameter of the wire guide 60 was maintained within a diameter difference of no greater that 0.0025 inches. This further improvement in wire positioning was found to allow the PTWA process to run in a stable condition while utilizing a broader range of quality of the wire feedstock.

Importantly, such modifications allow the PTWA torch to operate with much greater robustness, being less sensitive to instabilities in process parameters and operating conditions. The PTWA torch can also be operated at much higher wire feed/deposition rates, by more than 45 percent greater than prior art PTWA torches, while experiencing no decrease in deposit quality and no spitting. For example, deposition (wire feed) rates of in excess of 350 inches per minute can now be achieved for continuous stable operation, as opposed to approximately 240 inches per minute for the prior art PTWA torch at otherwise similar operating conditions and/or parameters.

As can be seen above, provided herein is an embodiment directed to a method of thermally depositing metal onto a target surface using a plasma transferred wire arc thermal spray apparatus, wherein the apparatus comprises a cathode, a nozzle generally surrounding a free end of said cathode in spaced relation having a constricted orifice opposite said cathode free end, a source of plasma gas that is directed into said nozzle surrounding said cathode and exiting said constricted nozzle orifice, and a wire feed directing a free end of a consumable wire, having a central axis, to a position for establishing and maintaining a plasma arc and melting the free end of the consumable wire, wherein the consumable wire has an electrical potential opposite of the cathode, the method comprising the steps of offsetting the central axis of the consumable wire with respect to an axial centerline of the constricting orifice; and establishing and operating a plasma transferred wire are between the cathode and a free end of the consumable wire; and melting and atomizing a continually fed free end of the consumable wire into molten metal particles and projecting the particles onto said target surface.

In specific embodiments, the method may include the step of coating the target surface with metal that is at least essentially free of at least one of large inclusions and partially unmelted wire. The method may also include the step of offsetting the consumable wire at an offset perpendicular to the axial centerline of the constricting orifice. The method may also include the steps of establishing and operating a plasma transferred wire arc between a cathode and the substantially free end of a consumable wire electrode, the energy of such plasma and arc being sufficient to not only melt and atomize the free-end of the wire into molten metal particles, but also project the particles as a column onto said target surface at a wire feed rate of 100-500 inches per minute for continuous periods in excess of 50 hours; substantially surrounding the plasma and arc with high velocity gas streams that converge beyond the intersection of the wire free-end with the plasma arc, but substantially avoid direct impingement with the wire and assist the atomization and projection of the particles to the target surface; and positioning the central axis of the consumable wire electrode with respect to the central axis of the plasma and plasma arc a distance of between about 0.002 inches and about 0.020 inches, such offset being in the plane which is at substantially right angles to the central axis of the plasma. In a specific embodiment, the energy of said plasma and arc is created by use of a plasma gas between 50 and 140 psig and flows from 2-5 scfm and an electrical current to said cathode and said wire electrode of between 30 and 200 amps. Moreover, the high velocity gas streams may have a flow velocity of about 20-60 scfm. The method may also include the step of rotating the plasma about the wire electrode. In a specific embodiment, the direction of rotation of said plasma about said wire electrode is in the same as the direction of said offset direction of the wire electrode relative to the central axis of rotation. A preferred method also may provide for the thermally depositing of metal at increased, rates and substantially free of large inclusions onto a target surface, and comprise the steps of establishing and operating a plasma transferred wire arc between a cathode and the substantially free end of a consumable wire electrode, the energy of such plasma and arc being sufficient to not only melt and atomize the free-end of the wire into molten metal particles, but also project the particles onto said target surface; substantially surrounding the plasma and arc with high velocity gas streams that converge beyond the intersection of the wire free-end with the plasma arc, and assist the atomization and projection of the particles to the target surface; and positioning the central axis of the consumable wire electrode with respect to the central axis of the plasma and plasma arc at an offset, such offset being in the plane which is at substantially right angles to the central axis of the plasma.

From the foregoing, it is also seen that another method of thermally depositing metal onto a target surface using a plasma transferred wire arc thermal spray apparatus, wherein the apparatus comprises a cathode, a nozzle generally surrounding a free end of said cathode in spaced relation having a constricted orifice opposite said cathode free end, a source of plasma gas that is directed into said nozzle surrounding said cathode and exiting said constricted nozzle orifice, and a wire feed directing a free end of a consumable wire, having a central axis, to a position for establishing and maintaining a plasma arc and melting the free end of the consumable wire, wherein the central axis of the consumable wire is offset with respect to an axial centerline of the constricting orifice; wherein the consumable wire has an electrical potential opposite of the cathode, comprises the steps of establishing and operating a plasma transferred wire arc between the cathode and a free end of the consumable wire which is offset with respect to an axial centerline of the constricting orifice; and melting and atomizing a continually fed free end of the consumable wire into molten metal particles and projecting the particles onto said target surface.

As disclosed herein, a plasma transferred wire arc thermal spray apparatus for thermally depositing molten metal from a continuously fed free end of a consumable wire onto a target surface is also provided. In a preferred embodiment, the apparatus comprises a cathode; a nozzle generally surrounding a free end of said cathode in spaced relation, the nozzle having a constricted orifice opposite said cathode free end; a source of plasma gas that is directed into said nozzle surrounding said cathode and exiting said constricted nozzle orifice towards the free end of a consumable wire; a wire feed means directing the free end of the consumable wire, having a central axis, to a position for establishing and maintaining a plasma arc and melting the free end of the consumable wire, wherein the central axis of the consumable wire is offset with respect to an axial centerline of the constricting orifice, wherein the consumable wire has an electrical potential opposite of the cathode; means for establishing and operating a plasma transferred wire arc between the cathode and a free end of the consumable wire; and means for melting and atomizing a continually fed free end of the consumable wire into molten metal particles and projecting the particles onto said target surface.

In specific embodiments, the plasma transferred wire arc apparatus may be rotated about a central axis of rotation. In another specific embodiment, the central axis of the consumable wire electrode is offset from the central axis of the constricting orifice and maintained in a plane which is at right angles to the central axis of the plasma. Preferably, the direction of rotation is in the same direction as the offset direction of the central axis of the wire electrode in relation to the central axis of the plasma. The apparatus may also comprise means for directing plasma gas into the nozzle, increasing the electrical potential difference between the cathode and the nozzle to project an extended plasma-arc out of the nozzle orifice; transferring the extended arc and resulting plasma jet to the wire free-end which results in melting and atomization of the wire free-end into fine particles; and projecting the atomized metal particles onto the target surface by influence of the projection energy of the plasma jet and the surrounding curtain of secondary gas flow; and maintaining an offset position for the central axis of the wire feedstock with respect to the central axis nozzle orifice and of the plasma jet. The apparatus may also comprise a plurality of gas ports in the nozzle and arranged around the nozzle orifice to project a surrounding curtain of secondary gas streams that converge with respect to the plasma arc axis to intersect at a location beyond the wire free end. The plasma may also be rotated about the central axis of the plasma transferred wire arc torch. In a preferred embodiment, the central axis of the wire electrode is offset from the central axis of the plasma by an amount in the range of 0.002 inches to 0.020 inches. Even more preferably, the offset is about 0.004 inches. The wire electrode may also be fully guided within said wire guide tip up to the point where the end of the wire guide tip is on, or at least substantially on, the edge of the outside of the secondary gas jets.

As also can be seen from the foregoing, a product may be made by the methods as set forth herein and/or using the apparatus as set forth herein.

While the best mode and viable alternatives for carrying out the present invent have been described in detail, those familiar with the art to which this invention relates will recognize various alternative designs and variations for the practicing of the invention as defined by the following claims:

What is claimed is:

1. A method of thermally depositing metal onto a target surface using a plasma transferred wire arc thermal spray apparatus that rotates around a central axis of rotation, wherein the apparatus comprises a cathode, a nozzle generally surrounding a free end of said cathode in spaced relation having a constricted orifice opposite said cathode free end, a source of plasma gas that is directed into said nozzle surrounding said cathode and exiting said constricted nozzle orifice, and a wire feed directing a free end of a consumable wire, having a central axis, to a position for establishing and maintaining a plasma arc and melting the free end of the consumable wire, wherein the consumable wire has an electrical potential opposite of the cathode, the method comprising the steps of:

offsetting the central axis of the consumable wire with respect to an axial centerline of the constricting orifice by at least one of the following:

- offsetting the central axis of the consumable wire with respect to the central axis of rotation; and
- offsetting the axial centerline of the constricting orifice with respect to the central axis of rotation; and establishing and operating a plasma transferred wire arc between the cathode and a free end of the consumable wire; and melting and atomizing a continually fed free end of the consumable wire into molten metal particles and projecting the particles onto said target surface.

2. The method as claimed in claim 1, including the step of coating the target surface with metal that is at least essentially free of at least one of large inclusions and partially unmelted wire.

3. The method as claimed in claim 1, wherein the step of offsetting the central axis of the consumable wire with respect to an axial centerline of the constricting orifice includes the step of offsetting the consumable wire at an offset perpendicular to the axial centerline of the constricting orifice.

4. The method as claimed in claim 1, including the steps of:

establishing and operating a plasma transferred wire arc between a cathode and the substantially free end of a consumable wire electrode, the energy of such plasma and arc being sufficient to not only melt and atomize the free-end of the wire into molten metal particles, but also project the particles as a column onto said target surface at a wire feed rate of 100-500 inches per minute for continuous periods in excess of 50 hours;

substantially surrounding the plasma and arc with high velocity gas streams that converge beyond the intersection of the wire free-end with the plasma arc, but substantially avoid direct impingement with the wire and assist the atomization and projection of the particles to the target surface; and positioning the central axis of the consumable wire electrode with respect to the central axis of the plasma and plasma arc a distance of between about 0.002 inches and about 0.020 inches, such offset being in the plane which is at substantially right angles to the central axis of the plasma.

5. The method as claimed in claim 4, wherein the energy of said plasma and arc is created by use of a plasma gas between 50 and 140 prig and flows from 2-5 scfm and an electrical current to said cathode and said wire electrode of between 30 and 200 amps.

6. The method as claimed in claim 4, wherein the high velocity gas streams have a flow velocity of about 20-60 scfm.

7. The method as claimed in claim 4, including the step of rotating the plasma about the wire electrode.

8. The method as claimed in claim 7, wherein the direction of rotation of said plasma about said wire electrode is in the same as the direction of said offset direction of the wire electrode relative to the central axis of rotation.

9. The method as claimed in claim 1, wherein the method provides for the thermally depositing of metal at increased rates and substantially free of large inclusions onto a target surface, comprising the steps of:

establishing and operating a plasma transferred wire arc between a cathode and the substantially free end of a consumable wire electrode, the energy of such plasma and arc being sufficient to not only melt and atomize the free-end of the wire into molten metal particles, but also project the particles onto said target surface;

substantially surrounding the plasma and arc with high velocity gas streams that converge beyond the intersection of the wire free-end with the plasma arc, and assist the atomization and projection of the particles to the target surface; and positioning the central axis of the consumable wire electrode with respect to the central axis of the plasma and plasma arc at an offset, such offset being in the plane which is at substantially right angles to the central axis of the plasma.

10. A method of thermally depositing metal onto a target surface using a plasma transferred wire arc thermal spray apparatus that rotates around a central axis of rotation, wherein the apparatus comprises a cathode, a nozzle generally surrounding a free end of said cathode in spaced relation having a constricted orifice opposite said cathode free end, a source of plasma gas that is directed into said nozzle surrounding said cathode and exiting said constricted nozzle orifice, and a wire feed directing a free end of a consumable wire, having a central axis, to a position for establishing and maintaining a plasma arc and melting the free end of the consumable wire, wherein the central axis of the consumable wire is offset with respect to an axial centerline of the constricting orifice; wherein the consumable wire has an electrical potential opposite of the cathode, the method comprising the steps of:

establishing and operating a plasma transferred wire arc between the cathode and a free end of the consumable wire which is offset with respect to an axial centerline of the constricting orifice by at least one of the following:

offsetting the central axis of the consumable wire with respect to the central axis of rotation; and offsetting the axial centerline of the constricting orifice with respect to the central axis of rotation; and melting and atomizing a continually fed free end of the consumable wire into molten metal particles and projecting the particles onto said target surface.

11. A plasma transferred wire arc thermal spray apparatus, which rotates around a central axis of rotation, for thermally depositing molten metal from a continuously fed free end of a consumable wire onto a target surface, the apparatus comprising:

a cathode;

a nozzle generally surrounding a free end of said cathode in spaced relation, the nozzle having a constricted orifice opposite said cathode free end;

a source of plasma gas that is directed into said nozzle surrounding said cathode and exiting said constricted nozzle orifice towards the free end of a consumable wire;

a wire feed means directing the free end of the consumable wire, having a central axis, to a position for establishing and maintaining a plasma arc and melting the free end of the consumable wire, wherein at least one of the central axis of the consumable wire and the axial centerline of the constricting orifice is offset with respect to the central axis of rotation, wherein the consumable wire has an electrical potential opposite of the cathode;

means for establishing and operating a plasma transferred wire arc between the cathode and a free end of the consumable wire; and means for melting and atomizing a continually fed free end of the consumable wire into molten metal particles and projecting the particles onto said target surface.

12. The apparatus as claimed in claim 11, wherein the plasma transferred wire arc apparatus is rotated about a central axis of rotation.

13. The apparatus as claimed in claim 11, in which the central axis of the consumable wire electrode is offset from the central axis of the constricting orifice and maintained in a plane which is at right angles to the central axis of the plasma.

14. The apparatus as claimed in claim 11, wherein the direction of rotation is in the same direction as the offset direction of the central axis of the wire electrode in relation to the central axis of the plasma.

15. The apparatus as claimed in claim 11, wherein the apparatus comprises means for:

directing plasma gas into the nozzle, increasing the electrical potential difference between the cathode and the nozzle to project an extended plasma-arc out of the nozzle orifice;

transferring the extended arc and resulting plasma jet to the wire free-end which results in melting and atomization of the wire free-end into fine particles; and projecting the atomized metal particles onto the target surface by influence of the projection energy of the plasma jet and the surrounding curtain of secondary gas flow; and maintaining an offset position for the central axis of the wire feedstock with respect to the central axis nozzle orifice and of the plasma jet.

16. The apparatus as claimed in claim 11, comprising a plurality of gas ports in the nozzle and arranged around the nozzle orifice to project a surrounding curtain of secondary gas streams that converge with respect to the plasma arc axis to intersect at a location beyond the wire free end.

17. The plasma transferred wire arc thermal spraying apparatus as claimed in claim 11, wherein the plasma is rotated about the central axis of the plasma transferred wire arc torch.

18. The plasma transferred wire arc thermal spraying apparatus as claimed in claim 11, wherein the central axis of wire electrode is offset from the central axis plasma and maintained in the plane which is at right angles to the central axis of the plasma.

19. The plasma transferred wire arc thermal spraying apparatus as claimed in claim 11, in which the direction of rotation is in the same direction as the offset direction of the central axis of the wire electrode is relation to the central axis of the plasma.

20. The plasma transferred wire arc thermal spraying apparatus as claimed in claim 11, in which the central axis of the wire electrode is offset from the central axis of the plasma by an amount in the range of 0.002 inches to 0.020 inches.

21. The plasma transferred wire arc thermal spraying apparatus as claimed in claim 20, wherein the offset is about 0.004 inches.

22. The plasma transferred wire arc thermal spraying apparatus as claimed in claim 11, wherein the wire electrode is fully guided within said wire guide tip up to the point where the end of the wire guide tip is on the edge of the outside of the secondary gas jets.

23. The plasma transferred wire arc thermal spraying apparatus as claimed in claim 11, wherein the wire electrode is fully guided within said wire guide tip up to the point where the end of the wire guide tip is substantially on the edge of the outside of the secondary gas jets.

24. A product made by the method as claimed in claim 1.

25. A product made by the method as claimed in claim 10.

26. A product made using the apparatus as claimed in claim 11.

* * * * *